United States Patent [19]
Schexnayder

[11] 3,943,717
[45] Mar. 16, 1976

[54] CONTAMINANT REMOVAL FROM A HYDRAULIC CYLINDER

[75] Inventor: Lawrence F. Schexnayder, Joliet, Ill.

[73] Assignee: Caterpillar Tractor Co., Peoria, Ill.

[22] Filed: Feb. 13, 1975

[21] Appl. No.: 549,609

Related U.S. Application Data

[63] Continuation-in-part of Ser. No. 431,328, Jan. 7, 1974, abandoned.

[52] U.S. Cl. .................... 60/453; 60/455; 92/86; 277/19; 277/59
[51] Int. Cl.² ........................................ F15B 21/04
[58] Field of Search ............ 60/378, 453, 454, 455; 92/82, 86, 165 R; 277/19, 59

[56] References Cited
UNITED STATES PATENTS

| 2,961,829 | 11/1960 | Weisenbach | 60/454 X |
| 3,030,118 | 4/1962 | Groce | 277/59 X |
| 3,578,341 | 5/1971 | Le Febrve | 277/19 X |
| 3,768,371 | 10/1973 | Orme | 92/86 X |

Primary Examiner—Edgar W. Geoghegan
Attorney, Agent, or Firm—Phillips, Moore, Weissenberger Lempio & Strabala

[57] ABSTRACT

A hydraulic cylinder comprises a piston reciprocally mounted in a housing thereof. A pair of annular sealing means, slidably receiving a rod of the piston, are disposed on either side of an annular chamber which has pressurized fluid pumped therethrough for flushing purposes.

7 Claims, 1 Drawing Figure

U.S. Patent   March 16, 1976   3,943,717
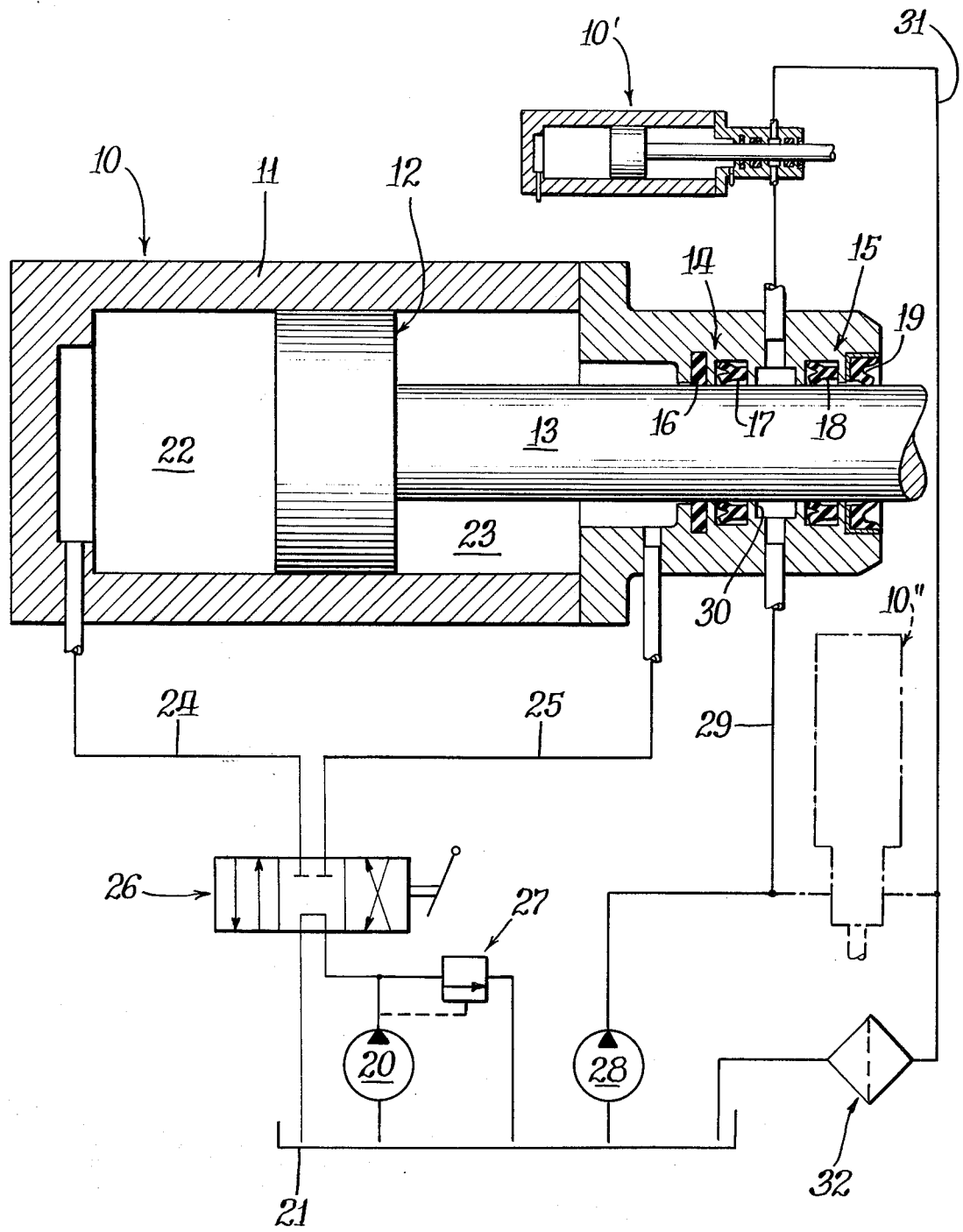

CONTAMINANT REMOVAL FROM A HYDRAULIC CYLINDER

CROSS REFERENCE TO RELATED APPLICATIONS

This application is a continuation-in-part Application of U.S. Pat. Application Ser. No. 431,328, filed on Jan. 7, 1974, now abandoned, by Lawrence F. Schexnayder, entitled HYDRAULIC CYLINDER ROD SEALING AND FLUSHING ARRANGEMENT, of common assignment herewith.

BACKGROUND OF THE INVENTION

Conventional hydraulic cylinders of the type used for actuating earthworking implements normally seal the rod end of the cylinder by means of a plurality of static seals. The seals perform a dual function; namely, to prevent egress of hydraulic fluid from the cylinder's working chamber and to prevent ingress of contaminants into the cylinder. U.S Pat. Nos. 3,540,741 and 3,578,341, for example, exemplify such prior art sealing structures.

SUMMARY OF THE INVENTION

An object of this invention is to provide an economical and compact flushing arrangement for a hydraulic cylinder to prevent the leakage of hydraulic fluid therefrom and to prevent contamination of such fluid. The cylinder comprises inboard and outboard annular sealing means mounted on a housing of the cylinder to slidably receive the rod of a piston, reciprocally mounted in the housing. The flushing arrangement comprises an annular chamber formed in the housing and disposed axially between the inboard and outboard sealing means. A pressurized fluid source, including a pump, continuously circulates fluid through the chamber, by suitably arranged conduits, to continuously flush-out working fluid which may leak past the inboard sealing means and to further flush-out contaminants which may pass by the outboard sealing means and into the chamber.

BRIEF DESCRIPTION OF THE DRAWING

The drawing schematically illustrates a hydraulic circuit including a hydraulic cylinder, in cross section, and a flushing arrangement therefor.

DETAILED DESCRIPTION

Referring to the drawing, the illustrated hydraulic circuit comprises a double-acting cylinder 10 having a housing 11 and a piston 12 reciprocally mounted therein. A rod 13 of the piston is slidably received in sealing contact by inboard and outboard annular sealing means 14 and 15, respectively. The rod may be operatively connected to a work implement, such as one of those employed on a heavy-duty earthworking machine.

The inboard sealing means comprises a buffer seal 16, having a rectangular cross section, and a first radial lip seal 17. The buffer seal functions to protect seal 17 against high fluid pressures. The outboard sealing means comprises a second radial lip seal 18, similar to seal 17 and also facing axially towards seal 16, and a third radial lip seal 19 having its outer case attached to the housing and facing axially away from seal 18. The radial lip seals 17, 18, 19 may be constructed in accordance with U.S. Pat. No. 3,167,323 to Appleton et al, assigned to Disogrin Industries. The seals must be capable of lateral flexure while maintaining efficient sealing characteristics because they are utilized in cooperation with the rod 13 of the reciprocating piston 12 which rod tends to urge the seal elements from side to side during reciprocation. Seals intended for use in sealing rotary elements would not be effective in the present environment.

The hydraulic circuit further comprises a pressurized fluid source, including an engine driven first pump 20 adapted to selectively pump highly pressurized hydraulic fluid from a reservoir 21 to the cylinder. In particular, working chambers 22 and 23, located at the head and rod ends of the cylinder, respectively, may be alternately pressurized and exhausted via conduits 24 and 25 under the control of a three-positioned directional control valve 26. A conventional pilot operated relief valve 27 is also incorporated into the circuit to maintain circuit pressures at the desired level.

The hereinafter described flushing arrangement for the cylinder is adapted to return any fluid which may leak past inboard sealing means 14 to reservoir 21 and to also flush-out contaminants which may pass by outboard sealing means 15. Such arrangement comprises a second engine driven pump 28 which is adapted to continuously pump low pressure fluid through a conduit 29 and into an annular chamber 30, formed in housing 11. The chamber is disposed axially between the inboard and outboard sealing means and has its outlet connected to a conduit 31 which returns the circulating low pressure fluid through a filter 32 and back to reservoir 21. If so desired, one or more additional cylinders 10', identical to cylinder 10, may be integrated into the fluid circuit to take advantage of the flushing arrangement above described. Also, a cylinder 10" could be added to the circuit in parallel as indicated by phantom lines in the drawing.

I claim:

1. A hydraulic cylinder in combination with flushing means therefor, said cylinder comprising
    a housing,
    a piston reciprocally mounted in said housing, and
    inboard and outboard annular sealing means mounted on said housing for slidably receiving a rod of said reciprocating piston in sealing contact therewith, said flushing means comprising
    means forming an annular chamber in said housing, said chamber disposed axially between said inboard and outboard sealing means,
    a pressurized fluid source, including a pump and a reservoir, and
    conduit means communicating said pump with said chamber and said chamber with said reservoir for continuously circulating fluid into and out of said chamber for flushing out and for pressurizing said chamber, said inboard annular sealing means comprising annular buffer seal means for substantially restricting outflow of pressurized fluid from one of said working chambers and a separate annular first lip seal disposed adjacent to said buffer seal and facing axially theretowards, said buffer seal means including a flat elastomeric ring member.

2. The combination of claim 1 wherein said pressurized fluid source further comprises a second pump operatively connected to working chambers disposed at head and rod ends of said cylinder and further comprising control valve means operatively connected between said second pump and said working chambers for selectively and alternately pressurizing and exhausting said working chambers of said cylinder.

3. The combination of claim 1 wherein said flushing means further comprise filter means operatively connected in said conduit means between said cylinder and said reservoir for removing contaminants tending to collect in said chamber.

4. The combination of claim 1 further comprising a second said hydraulic cylinder integrated into said conduit means, between said first-mentioned cylinder and said reservoir, an inlet to the annular chamber of said second cylinder operatively connected by said conduit means to an outlet of the annular chamber of said first-mentioned cylinder and having an outlet thereof operatively connected by said conduit means to said reservoir.

5. The invention of claim 1 wherein said outboard annular sealing means comprises a second separate annular lip seal facing inwardly towards said first sealing means and a third separate annular lip seal facing axially away from said second lip seal.

6. A hydraulic cylinder in combination with flushing means therefor, said cylinder comprising
   a housing,
   a piston reciprocally mounted in said housing, and
   inboard and outboard annular sealing means mounted on said housing for slidably receiving a rod of said reciprocating piston in sealing contact therewith, said flushing means comprising
   means forming an annular chamber in said housing, said chamber disposed axially between said inboard and outboard sealing means,
   a pressurized fluid source, including a pump and a reservoir, and
   conduit means communicating said pump with said chamber and said chamber with said reservoir for continuously circulating fluid into and out of said chamber for flushing out and for pressurizing said chamber, said pressurized fluid source further comprising a second pump operatively connected to working chambers disposed at head and rod ends of said cylinder and further comprising control valve means operatively connected between said second pump and said working chambers for selectively and alternately pressurizing and exhausting said working chambers of said cylinder, said inboard annular sealing means comprising annular buffer seal means for substantially restricting outflow of pressurized fluid from one of said working chambers and a separate annular first lip seal disposed adjacent to said buffer seal and facing axially theretowards, said buffer seal means including a flat elastomeric ring member.

7. The combination of claim 6 wherein said outboard annular sealing means comprises a second separate annular lip seal facing inwardly towards said first sealing means and a third separate annular lip seal facing axially away from said second lip seal.

* * * * *